United States Patent [19]
Zones et al.

[11] Patent Number: 6,103,215
[45] Date of Patent: Aug. 15, 2000

[54] ZEOLITE ME-UTD-1

[75] Inventors: Stacey I. Zones, San Francisco; Cong-Yan Chen, Richmond, both of Calif.

[73] Assignee: Chevron U.S.A. Inc., San Ramon, Calif.

[21] Appl. No.: 08/870,615

[22] Filed: Jun. 6, 1997

Related U.S. Application Data

[60] Provisional application No. 60/019,413, Jun. 7, 1996.

[51] Int. Cl.[7] ............................ C01B 39/46; C01B 39/48; C01B 39/06; C01B 39/12
[52] U.S. Cl. .......................... 423/702; 423/712; 423/713; 423/718
[58] Field of Search .................................. 423/702, 712, 423/713, 718

[56] References Cited

U.S. PATENT DOCUMENTS

| | | | |
|---|---|---|---|
| Re. 28,341 | 2/1975 | Wadlinger et al. | 423/DIG. 27 |
| 3,769,202 | 10/1973 | Plank et al. | 208/111 |
| 3,894,107 | 7/1975 | Butter et al. | 260/668 |
| 4,181,598 | 1/1980 | Gillespie et al. | 208/58 |
| 4,297,328 | 10/1981 | Ritscher et al. | 423/213 |
| 4,401,633 | 8/1983 | Sun | 423/709 |
| 4,556,549 | 12/1985 | Valyocsik | 502/60 |
| 4,568,654 | 2/1986 | Valyocsik | 502/62 |
| 4,576,805 | 3/1986 | Chang et al. | 502/71 |
| 4,579,831 | 4/1986 | Field | 502/66 |
| 4,910,006 | 3/1990 | Zones et al. | 423/328 |
| 4,921,594 | 5/1990 | Miller | 208/58 |
| 5,082,990 | 1/1992 | Hsieh et al. | 585/467 |
| 5,106,801 | 4/1992 | Zones et al. | 502/64 |
| 5,139,761 | 8/1992 | Nair et al. | |
| 5,143,878 | 9/1992 | Dai et al. | 502/79 |
| 5,149,421 | 9/1992 | Miller | 208/114 |
| 5,187,132 | 2/1993 | Zones et al. | 502/64 |
| 5,316,753 | 5/1994 | Nakagawwa | 423/706 |
| 5,334,367 | 8/1994 | Rosinski et al. | 423/704 |
| 5,489,424 | 2/1996 | Balkus et al. | 423/702 |
| 5,534,135 | 7/1996 | Dai et al. | 502/79 |
| 5,601,798 | 2/1997 | Cooper et al. | 423/79 |
| 5,830,429 | 11/1998 | Balkus et al. | 423/702 |

FOREIGN PATENT DOCUMENTS

97/29046  8/1997  WIPO.

OTHER PUBLICATIONS

Lobo et al., "Characterization of the Extra–Large–Pore Zeolite UTD–1," J. Am. Chem Soc., vol. 19, No. 36, pp. 8474–8484, Sep. 1997.

Balkus, Jr. et al., "The Synthesis and Characterization of UTD–1: The First Large Pore Zeolite Based Upon 14 Membered Ring System," Stud. Surf. Sci. Catal., vol. 105, pp. 415–421, 1997.

Balkus, Jr. et al., "Synthesis and Characterization of UTD–1: A Novel Zeolite Molecular Sieve," Sythesis of Porous Materials: Zeolite,Clays and Nanocomposites, Occelli et al. eds., Marcel Dekker, New York, 77–91, 1996.

Balkus, Jr. et al., "Molecular Sieve Synthesis using Metallocenes as Structure Directing Agents," Mat. Res. Soc. Symp., vol. 368, pp. 369–375, 1995.

Zones et al., "Boron–Beta Zeolite Hydrothermal Conversions: The Influence of Templates Structure of Boron Concentration and Source," Microporous Materials, vol. 2, pp. 543–555, 1994.

Meier et al., Atlas of Zeolite Structure Types, pp. 3–14, 58, 59, 106, 107, 189, 1992.

Balkus, K.J., et al., "The synthesis of UTD–1, Ti–UTD–1 and Ti–UTD–8 using Cp*2CoOH as a structure directing agent", Chemical Abstracts, vol. 124, No. 8, Feb. 19, 1996.

Stud. Surf. Sci. Catal. (1995), 97 (Zeolites: A Refined Tool for Designing Catalytic Sites), pp. 19–25, 1995 (No Month).

*Primary Examiner*—Mark L. Bell
*Assistant Examiner*—David Sample
*Attorney, Agent, or Firm*—W. K. Turner; R. J. Sheridan

[57] ABSTRACT

An aluminosilicate zeolite is disclosed which has a silica/alumina mole ratio of about 500 or less and pores with at least one cross-sectional dimension greater than 7.5 Angstroms. Also disclosed is a zeolite comprising a first oxide selected from the group consisting of silicon oxide, germanium oxide and mixtures thereof and a second oxide selected from the group consisting of aluminum oxide, gallium oxide, iron oxide, indium oxide and mixtures of aluminum oxide, boron oxide, gallium oxide, iron oxide, indium oxide, titanium oxide, and vanadium oxide, the zeolite having, after calcination, the X-ray diffraction lines of Table I, and having a mole ratio of the first oxide to the second oxide of about 500 or less. The zeolites are useful in catalysts for hydrocarbon conversion reactions.

12 Claims, No Drawings

ZEOLITE ME-UTD-1

This application claims benefit of Provisional Application 60/019,413 filed Jun. 7, 1996.

BACKGROUND OF THE INVENTION

1. Field of the Invention

The present invention relates to new crystalline zeolite Me-UTD-1, methods for preparing Me-UTD-1, and processes employing a catalyst comprising Me-UTD-1.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

U.S. Pat. No. 5,489,424, issued Feb. 6, 1996 to Balkus et al., discloses an all-silica zeolite designated "UTD-1" which is prepared using a bis(pentamethylcyclopentadienyl) cobalt (III) ion as a templating agent. Balkus et al. characterize UTD-1 as having a pore size at least as large as 7 Å. In addition, the X-ray diffraction pattern for as-synthesized UTD-1 is provided.

SUMMARY OF THE INVENTION

The present invention is directed to a family of crystalline molecular sieves with unique properties, referred to herein as "zeolite Me-UTD-1" or simply "Me-UTD-1". The designation "Me-UTD-1" is used to indicate that the zeolite has the crystal structure of the UTD-1 disclosed in U.S. Pat. No. 5,489,424, but contains atoms other than silicon and oxygen, preferably a metal ("Me") such as aluminum, in the crystal framework. Preferably Me-UTD-1 is obtained in its aluminosilicate form. As used herein the term "aluminosilicate" refers to a zeolite containing oxides of both aluminum and silicon in the framework.

In accordance with the present invention, there is provided an aluminosilicate zeolite having a silica/alumina mole ratio of about 500 or less and having pores with at least one cross-sectional dimension greater than 7.5 Angstroms, preferably at least about 8 Angstroms. The calcined zeolite has the X-ray diffraction lines of Table I.

Further in accordance with this invention there is provided a zeolite comprising a first oxide selected from the group consisting of silicon oxide, germanium oxide and mixtures thereof and a second oxide selected from the group consisting of aluminum oxide, gallium oxide, iron oxide, indium oxide and mixtures of aluminum oxide, boron oxide, gallium oxide, iron oxide, indium oxide, titanium oxide, and vanadium oxide, said zeolite having, after calcination, the X-ray diffraction lines of Table I, and having a mole ratio of the first oxide to the second oxide of about 500 or less. The present invention also includes this zeolite which is predominantly in the hydrogen form, which hydrogen form is prepared by ion exchanging with an acid or with a solution of an ammonium salt followed by a second calcination. Further provided is this zeolite made substantially free of acidity by neutralizing said zeolite with a basic metal.

Also provided in accordance with the present invention is a method of preparing a boron-containing zeolite comprising oxides of born and silica, said zeolite having, after calcination, the X-ray diffraction lines of Table I, said method comprising:

(a) preparing an aqueous solution containing calcined boron-containing Beta zeolite, an alkali metal or alkaline earth metal cation, and a bis (pentamethylcyclopentadienyl) cobalt (III) ion having an anionic counterion which is not detrimental to the formation of the boron-containing zeolite;

(b) maintaining the aqueous solution under conditions sufficient to form crystals of the boron-containing zeolite; and (c) recovering crystals of the boron-containing zeolite.

The present invention additionally provides a process for converting hydrocarbons comprising contacting a hydrocarbonaceous feed at hydrocarbon converting conditions with a catalyst comprising the Me-UTD-1 zeolite of this invention, preferably predominantly in the hydrogen form.

Further provided by the present invention is a hydrocracking process comprising contacting a hydrocarbon feedstock under hydrocracking conditions with a catalyst comprising the Me-UTD-1 of this invention, preferably predominantly in the hydrogen form.

This invention also includes a dewaxing process comprising contacting a hydrocarbon feedstock under dewaxing conditions with a catalyst comprising the Me-UTD-1 of this invention, preferably predominantly in the hydrogen form.

This invention also includes a process for improving the viscosity index of the dewaxed product of waxy hydrocarbon feeds comprising contacting the waxy hydrocarbon feed under isomerization dewaxing conditions with a catalyst comprising the Me-UTD-1 of this invention, preferably predominantly in the hydrogen form.

Also provided by this invention is a process for producing a $C_{20+}$ lube oil from a $C_{20+}$ olefin feed comprising isomerizing said olefin feed over a catalyst comprising at least one Group VIII metal and the Me-UTD-1 of this invention, preferably predominantly in the hydrogen form.

Further provided in accordance with the present invention is a process for catalytically dewaxing a hydrocarbon oil feedstock boiling above about 350° F. and containing straight chain and slightly branched chain hydrocarbons comprising contacting said hydrocarbon oil feedstock in the presence of added hydrogen gas at a hydrogen pressure of about 15–3000 psi with a catalyst comprising at least one Group VIII metal and the Me-UTD-1 of this invention, preferably predominantly in the hydrogen form. Also provided is such a process wherein said catalyst comprises a layered catalyst comprising a first layer comprising at least one Group VIII metal and the Me-UTD-1 of this invention, and a second layer comprising an aluminosilicate zeolite which is more shape selective than the zeolite of said first layer.

The present invention also provides a process for preparing a lubricating oil which comprises:
hydrocracking in a hydrocracking zone a hydrocarbonaceous feedstock to obtain an effluent comprising a hydrocracked oil, and catalytically dewaxing said effluent comprising hydrocracked oil at a temperature of at least about 400° F. and at a pressure of from about 15 psig to about 3000 psig in the presence of added hydrogen gas with a catalyst comprising at least one Group VIII metal and the Me-UTD-1 of this invention, preferably predominantly in the hydrogen form.

Further provided is a process for isomerization dewaxing a raffinate comprising contacting said raffinate in the presence of added hydrogen with a catalyst comprising at least one Group VIII metal and the Me-UTD-1 of this invention, preferably predominantly in the hydrogen form.

Also included in this invention is a process for increasing the octane of a hydrocarbon feedstock to produce a product having an increased aromatics content comprising contacting a hydrocarbonaceous feedstock which comprises normal and slightly branched hydrocarbons having a boiling range above about 40° C. and less than about 200° C., under aromatic conversion conditions with a catalyst comprising the Me-UTD-1 of this invention, preferably made substantially free of acidity by neutralizing said zeolite with a basic metal. Also provided in this invention is such a process wherein the zeolite contains a Group VIII metal component.

Also provided by the present invention is a catalytic cracking process comprising contacting a hydrocarbon feedstock in a reaction zone under catalytic cracking conditions in the absence of added hydrogen with a catalyst comprising the Me-UTD-1 of this invention, preferably predominantly in the hydrogen form. Also included in this invention is such a catalytic cracking process wherein the catalyst additionally comprises a large pore crystalline cracking component.

The present invention further provides an isomerizing process for isomerizing $C_4$ to $C_7$ hydrocarbons, comprising contacting a catalyst, comprising at least one Group VIII metal impregnated on the Me-UTD-1 of this invention, preferably predominantly in the hydrogen form, with a feed having normal and slightly branched $C_4$ to $C_7$ hydrocarbons under isomerizing conditions. Also provided is such an isomerization process wherein the catalyst has been calcined in a steam/air mixture at an elevated temperature after impregnation of the Group VIII metal, preferably platinum.

This invention also provides a process for alkylating an aromatic hydrocarbon which comprises contacting under alkylation conditions at least a mole excess of an aromatic hydrocarbon with a $C_2$ to $C_{20}$ olefin under at least partial liquid phase conditions and in the presence of a catalyst comprising the Me-UTD-1 of this invention, preferably predominantly in the hydrogen form.

This invention additionally provides a process for transalkylating an aromatic hydrocarbon which comprises contacting under transalkylating conditions an aromatic hydrocarbon with a polyalkyl aromatic hydrocarbon under at least partial liquid phase conditions and in the presence of a catalyst comprising the Me-UTD-1 of this invention, preferably predominantly in the hydrogen form.

Further provided by this invention is a process to convert paraffins to aromatics which comprises contacting paraffins with a catalyst comprising gallium, zinc or a compound of gallium or zinc and the Me-UTD-1 of this invention, preferably made substantially free of acidity.

Also provided is a process for isomerizing olefins comprising contacting said olefin under conditions which cause isomerization of the olefin with a catalyst comprising the Me-UTD-1 of this invention, preferably predominantly in the hydrogen form.

Further provided in accordance with this invention is a process for isomerizing an isomerization feed comprising an aromatic $C_8$ stream of xylene isomers or mixtures of xylene isomers and ethylbenzene, wherein a more nearly equilibrium ratio of ortho-, meta and para-xylenes is obtained, said process comprising contacting said feed under isomerization conditions with a catalyst comprising the Me-UTD-1 of this invention, preferably predominantly in the hydrogen form.

The present invention further provides a process for oligomerizing olefins comprising contacting an olefin feed under oligomerization conditions with a catalyst comprising the Me-UTD-1 of this invention, preferably predominantly in the hydrogen form.

This invention also provides a process for converting lower alcohols and other oxygenated hydrocarbons comprising contacting said lower alcohol or other oxygenated hydrocarbon with a catalyst comprising the Me-UTD-1 of this invention, preferably predominantly in the hydrogen form, under conditions to produce liquid products.

Also provided by the present invention is an improved process for the reduction of oxides of nitrogen contained in a gas stream in the presence of oxygen wherein said process comprises contacting the gas stream with a zeolite, the improvement comprising using as the zeolite, the Me-UTD-1 of this invention. The zeolite may contain a metal or metal ions capable of catalyzing the reduction of the oxides of nitrogen, and the process may be conducted in the presence of a stoichiometric excess of oxygen. In a preferred embodiment, the gas stream is the exhaust stream of an internal combustion engine.

This invention also provides a process for converting hydrocarbons comprising contacting a hydrocarbonaceous feed at hydrocarbon converting conditions with a catalyst comprising a Group VIII metal and a silica zeolite having, after calcination, the X-ray diffraction lines of Table IA.

DETAILED DESCRIPTION OF THE INVENTION

The present invention comprises a family of crystalline, large pore zeolites, designated "Me-UTD-1". The Me-UTD-1 zeolites have pores which have at least one cross-sectional dimension which is at least 7.5 Angstroms, preferably at least about 8 Angstroms, more preferably about 8 to about 10 Angstroms. The pores appear to be in the form of 14 member rings.

In preparing Me-UTD-1 zeolites, a bis (pentamethylcyclopentadienyl) cobalt (III) ion is used as a crystallization template. In general, Me-UTD-1 is prepared by contacting an active source of silicon oxide and boron oxide (boron-containing Beta zeolite in its calcined form can be used as the sources of both the silicon oxide and boron oxide) with the bis(pentamethylcyclopentadienyl) cobalt (III) ion templating agent (designated as "Q" below) to form the borosilicate form of UTD-1 ("B-UTD-1"), followed by substitution of the boron in the B-UTD-1 framework with metal atoms, preferably aluminum.

The B-UTD-1 is prepared from a reaction mixture having the composition shown in Table A below.

TABLE A

| | Reaction Mixture | |
|---|---|---|
| | General | Preferred |
| Z/Y | 0.01–0.10 | 0.06–0.08 |
| OH⁻/YO$_2$ | 0.10–0.30 | 0.18–0.25 |
| Q/YO$_2$ | 0.05–0.30 | 0.08–0.15 |
| M$_{2/x}$/YO$_2$ | 0.05–0.20 | 0.08–0.12 |
| H$_2$O/YO$_2$ | 20–100 | 30–60 | where Y is selected from the group consisting of silicon, germanium and mixtures thereof; Z represents boron; Q comprises a bis(pentamethylcyclopentadienyl) cobalt (III) ion; M is an alkali or alkaline earth metal cation; and x is the valence of M.

The preferred source of silicon-oxide and boron oxide is calcined boron-containing zeolite Beta ("B-Beta"). One advantage of using B-Beta is that it provides B-UTD-1 with very small crystallite size, typically about 2000 Å or less, preferably about 500–1000 Å along the C axis as estimated by TEM.

In practice, B-UTD-1 is prepared by a process comprising:

(a) preparing an aqueous solution containing calcined B-Beta, an alkali metal or alkaline earth metal cation, and a bis(pentamethylcyclopentadienyl) cobalt (III) ion having an anionic counterion which is not detrimental to the formation of B-UTD-1;

(b) maintaining the aqueous solution under conditions sufficient to form crystals of B-UTD-1; and (c) recovering the crystals of B-UTD-1.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the B-UTD-1 zeolite are formed. The hydrothermal crystallization is usually conducted under autogenous pressure, at a temperature between about 140° C. and 170° C. The crystallization period is typically greater than 1 day and preferably from about 3 days to about 20 days.

The zeolite may be prepared with or without mild stirring or agitation.

During the hydrothermal crystallization step, the B-UTD-1 crystals can be allowed to nucleate spontaneously from the reaction mixture. The use of B-UTD-1 crystals as seed material can be advantageous in decreasing the time necessary for complete crystallization to occur. In addition, seeding can lead to an increased purity of the product obtained by promoting the nucleation and/or formation of B-UTD-1 over any undesired phases. When used as seeds, B-UTD-1 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized B-UTD-1 zeolite crystals, which, at this point, still contain some of the bis(pentamethylcyclopentadienyl) cobalt (III) ion template. The drying step can be performed at atmospheric pressure or under vacuum.

B-UTD-1 further has a composition, as synthesized and in the anhydrous state, in terms of mole ratios, shown in Table B below.

TABLE B

| As-Synthesized B-UTD-1 | |
|---|---|
| $YO_2/Z$ | about 50 or greater |
| $M_{2/x}/YO_2$ | $\leq 0.05$ |
| $Q/YO_2$ | 0.01–0.03 | where Y, Z, M, x and Q are as defined above.

The B-UTD-1 can then be treated to remove the cobalt-containing template and to exchange the boron in the B-UTD-1 framework with another element, e.g., aluminum. This is typically accomplished in two sequential steps. First, the boron can be removed from the framework of the B-UTD-1 by treatment with an excess of protons at pH preferably below 2. A variety of acids, such as HCl, $HNO_3$ or $H_2SO_4$, can be used. Components which buffer the system above about pH 3 will slow down the process. It is helpful to heat these acidic solutions, usually for 1–3 days of reaction to ensure a greater than 90% removal of the boron.

Thus, the B-UTD-1 is typically refluxed in acid, such as 2N HCl until the cobalt is dissolved. (The solution will turn pink as the cobalt dissolves.) This acid treatment also removes the boron from the B-UTD-1. When the acid treatment is finished, the zeolite crystals can be recovered, washed and reheated to about 140° C. in a solution containing a salt of the desired boron-replacing cation or cations. Thus, the Me-UTD-1 of this invention contains substantially no cobalt, and has at least part of the boron replaced by another cation or cations.

After the cobalt has been removed from the B-UTD-1 and the boron has been replaced by another element, the resulting Me-UTD-1 has a mole ratio of a first oxide selected from the group consisting of silicon oxide, germanium oxide and mixtures thereof to a second oxide selected from the group consisting of aluminum oxide, gallium oxide, iron oxide, indium oxide and mixtures of aluminum oxide, boron oxide, gallium oxide, iron oxide, indium oxide, titanium oxide, and vanadium oxide of about 500 or less, preferably about 500 to about 50, more preferably about 200 to about 50.

Me-UTD-1 is comprised of a framework structure or topology which is characterized by its X-ray diffraction pattern. Me-UTD-1 zeolites, in the calcined form, have a crystalline structure whose X-ray powder diffraction pattern exhibit the characteristic lines shown in Table I.

TABLE I

| Calcined Me-UTD-1 | | |
|---|---|---|
| 2 Theta | d | Relative Intensity[a] |
| 6.0 ± 0.1 | 14.4–15.0 | VS |
| 7.6 ± 0.1 | 11.5–11.8 | S |
| 14.55 ± 0.15 | 6.0–6.1 | W–M |
| 19.8 ± 0.1 | 4.4–4.5 | M |
| 21.2 ± 0.1 | 4.17–4.21 | VS |
| 22.0 ± 0.1 | 4.01–4.06 | M |
| 22.5 ± 0.1 | 3.92–3.96 | M |
| 24.5 ± 0.05 | 3.64–3.68 | W |

[a]The X-ray patterns provided are based on a relative intensity scale in which the strongest line in the X-ray pattern is assigned a value of 100:
W(weak) is less than 10;
M(medium) is between 10 and 40;
S(strong) is between 40 and 60;
VS(very strong) is greater than 60.

The X-ray powder diffraction pattern for B-UTD-1 also exhibits the characteristic lines shown in Table I.

All-silica UTD-1 zeolite (such as that disclosed in U.S. Pat. No. 5,489,424), in the calcined form, has a crystalline structure whose X-ray powder diffraction pattern exhibit the characteristic lines shown in Table IA below.

TABLE IA

Calcined all-silica UTD-1

| 2 Theta | d | Relative Intensity |
|---|---|---|
| 6.00 ± 0.05 | 14.6–14.9 | VS |
| 7.60 ± 0.10 | 11.5–11.8 | S–VS |
| 14.5 ± 0.10 | 6.05–6.15 | W–M |
| 18.0 ± 0.10 | 4.89–4.95 | W–M |
| 19.7 ± 0.10 | 4.48–4.53 | W–M |
| 21.0 ± 0.10 | 4.21–4.25 | M–S |
| 24.2 ± 0.10 | 3.66–3.69 | W–M |
| 24.95 ± 0.10 | 3.55–3.58 | W–M |

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

Unless otherwise indicated, the variation in the scattering angle (two theta) measurements, due to instrument error and to differences between individual samples, is estimated at +/−0.20 degrees.

Representative peaks from the X-ray diffraction pattern of calcined Me-UTD-1 are shown in Table I. Calcination can also result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Minor variations in the diffraction pattern can result from variations in the silica-to-alumina (or other oxide) mole ratio of the particular sample due to changes in lattice constants. In addition, sufficiently small crystals will affect the shape and intensity of peaks, leading to significant peak broadening. Notwithstanding these minor perturbations, the basic crystal lattice remains unchanged by these treatments.

Crystalline Me-UTD-1 normally will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina (or other oxide) mole ratio. The zeolite can also be steamed; steaming helps stabilize the crystalline lattice to attack from acids.

The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the zeolite by replacing some of the cations in the zeolite with metal cations via ion exchange techniques. Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the Me-UTD-1. The zeolite can also be impregnated with the metals, or, the metals can be physically and intimately admixed with the zeolite using standard methods known to the art.

Typical ion exchange techniques involve contacting the zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249 issued on Jul. 7, 1964 to Plank, et al.; 3,140,251 issued on Jul. 7, 1964 to Plank, et al.; and 3,140,253 issued on Jul. 7, 1964 to Plank, et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of Me-UTD-1, the spatial arrangement of the atoms which form the basic crystal lattice of the zeolite remains essentially unchanged.

Me-UTD-1 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

Me-UTD-1 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

Hydrocarbon Conversion Processes

Me-UTD-1 zeolites are useful in hydrocarbon conversion reactions. Hydrocarbon conversion reactions are chemical and catalytic processes in which carbon containing compounds are changed to different carbon containing compounds. Examples of hydrocarbon conversion reactions in which Me-UTD-1 are expected to be useful include catalytic cracking, hydrocracking, dewaxing, alkylation, and olefin and aromatics formation reactions. The catalysts are also expected to be useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating (including the alkylation of aromatics with other hydrocarbons), isomerizing polyalkyl substituted aromatics (e.g., m-xylene), and disproportionating aromatics (e.g., toluene) to provide mixtures of benzene, xylenes and higher methylbenzenes and oxidation reactions. Also included are rearrangement reactions to make various naphthalene derivatives. The Me-UTD-1 catalysts have high selectivity, and under hydrocarbon conversion conditions can provide a high percentage of desired products relative to total products. Me-UTD-1 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from normal alpha olefins, recycled plastic feedstocks, and, in general, can be any carbon-containing feedstock susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

For some reactions it is preferred that the Me-UTD-1 have acid sites. For those reactions, it is preferred that the Me-UTD-1 zeolite be predominantly in its hydrogen ion form, i.e., it is preferred that, after calcination, at least about 80% of the cation sites are occupied by hydrogen ions and/or rare earth ions.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., a Group VIII metal such platinum, include hydrogenation-dehydrogenation reactions, denitrogenation and desulfurization reactions.

The following table indicates typical reaction conditions which may be employed when using catalysts comprising Me-UTD-1 in the hydrocarbon conversion reactions of this invention. Preferred conditions are indicated in parentheses.

| Process | Temp., ° C. | Pressure | LHSV |
|---|---|---|---|
| Hydrocracking | 175–485 | 0.5–350 bar | 0.1–30 |
| Dewaxing | 200–475 (250–450) | 15–3000 psig (200–3000) | 0.1–20 (0.2–10) |
| Aromatics formation | 400–600 (480–550) | atm.-10 bar | 0.1–15 |
| Cat. cracking | 127–885 | subatm.-[1] (atm.-5 atm.) | 0.5–50 |
| Oligomerization | 232–649[2] 10–232[4] (27–204)[4] | 0.1–50 atm.[2,3] — — | 0.2–50[2] 0.05–20[5] (0.1–10)[5] |
| Paraffins to aromatics | 100–700 | 0–1000 psig | 0.5–40[5] |
| Condensation of alcohols | 260–538 | 0.5–1000 psig | 0.5–50[5] |
| Isomerization | 93–538 (204–315) | 50–1000 psig (1–4) | 1–10 |
| Xylene isomerization | 260–593[2] (315–566)[2] 38–371[4] | 0.5–50 atm.[2] (1–5 atm)[2] 1–200 atm.[4] | 0.1–100[5] (0.5–50)[5] 0.5–50 |

[1]Several hundred atmospheres
[2]Gas phase reaction
[3]Hydrocarbon partial pressure
[4]Liquid phase reaction
[5]WHSV Other reaction conditions and parameters are provided below.

Hydrocracking

Using a catalyst which comprises ME-UTD-1 in the hydrogen form and a hydrogenation promoter, heavy petroleum residual feedstocks, cyclic stocks and other charge stocks can be hydrocracked using the process conditions and catalyst components disclosed in the aforementioned U.S. Pat. No. 4,910,006 and U.S. Pat. No. 5,316,753.

The hydrocracking catalysts contain an effective amount of at least one hydrogenation component of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes thereof of the group consisting of at least one of platinum, palladium, rhodium, iridium, ruthenium and mixtures thereof or the group consisting of at least one of nickel, molybdenum, cobalt, tungsten, titanium, chromium and mixtures thereof Reference to the catalytically active metal or metals is intended to encompass such metal or metals in the elemental state or in some form such as an oxide, sulfide, halide, carboxylate and the like. The hydrogenation catalyst is present in an effective amount to provide the hydrogenation function of the hydrocracking catalyst, and preferably in the range of from 0.05 to 25% by weight.

Dewaxing

Me-UTD-1 in the hydrogen form can be used to dewax hydrocarbonaceous feeds by selectively removing straight chain paraffins. Typically, the viscosity index of the dewaxed product is improved (compared to the waxy feed) when the waxy feed is contacted with Me-UTD-1 under isomerization dewaxing conditions.

The catalytic dewaxing conditions are dependent in large measure on the feed used and upon the desired pour point. Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone. Typical feedstocks include light gas oil, heavy gas oils and reduced crudes boiling above about 350° F. Bright stock may also be used as the feedstock.

A typical dewaxing process is the catalytic dewaxing of a hydrocarbon oil feedstock boiling above about 350° F. and containing straight chain and slightly branched chain hydrocarbons by contacting the hydrocarbon oil feedstock in the presence of added hydrogen gas at a hydrogen pressure of about 15–3000 psi with a catalyst comprising Me-UTD-1 and at least one group VIII metal.

The Me-UTD-1 hydrodewaxing catalyst may optionally contain a hydrogenation component of the type commonly employed in dewaxing catalysts. See the aforementioned U.S. Pat. No. 4,910,006 and U.S. Pat. No. 5,316,753 for examples of these hydrogenation components.

The hydrogenation component is present in an effective amount to provide an effective hydrodewaxing and hydroisomerization catalyst preferably in the range of from about 0.05 to 5% by weight. The catalyst may be run in such a mode to increase isodewaxing at the expense of cracking reactions.

The feed may be hydrocracked, followed by dewaxing. This type of two stage process and typical hydrocracking conditions are described in U.S. Pat. No. 4,921,594, issued May 1, 1990 to Miller, which is incorporated herein by reference in its entirety.

Me-UTD-1 may also be utilized as a dewaxing catalyst in the form of a layered catalyst. That is, the catalyst comprises a first layer comprising zeolite Me-UTD-1 and at least one Group VIII metal, and a second layer comprising an aluminosilicate zeolite which is more shape selective than zeolite Me-UTD-1. The use of layered catalysts is disclosed in U.S. Pat. No. 5,149,421, issued Sep. 22, 1992 to Miller, which is incorporated by reference herein in its entirety. The layering may also include a bed of Me-UTD-1 layered with a non-zeolitic component designed for either hydrocracking or hydrofinishing.

Me-UTD-1 may also be used to dewax raffinates, including bright stock, under conditions such as those disclosed in U.S. Pat. No. 4,181,598, issued Jan. 1, 1980 to Gillespie et al., which is incorporated by reference herein in its entirety.

It is often desirable to use mild hydrogenation (sometimes referred to as hydrofinishing) to produce more stable dewaxed products. The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and a hydrogen recycle rate of about 400 to 1500 SCF/bbl. The hydrogenation catalyst employed must be active enough not only to hydrogenate the olefins, diolefins and color bodies which may be present, but also to reduce the aromatic content. Suitable hydrogenation catalyst are disclosed in U.S. Pat. No. 4,921,594, issued May 1, 1990 to Miller, which is incorporated by reference herein in its entirety. The hydrofinishing step is beneficial in preparing an acceptably stable product (e.g., a lubricating oil) since dewaxed products prepared from hydrocracked stocks tend to be unstable to air and light and tend to form sludges spontaneously and quickly.

Lube oil may be prepared using Me-UTD-1. For example, a $C_{20+}$ lube oil may be made by isomerizing a $C_{20+}$ olefin feed over a catalyst comprising Me-UTD-1 in the hydrogen form and at least one Group VIII metal. Alternatively, the lubricating oil may be made by hydrocracking in a hydrocracking zone a hydrocarbonaceous feedstock to obtain an effluent comprising a hydrocracked oil, and catalytically dewaxing the effluent at a temperature of at least about 400° F. and at a pressure of from about 15 psig to about 3000 psig in the presence of added hydrogen gas with a catalyst comprising Me-UTD-1 in the hydrogen form and at least one Group VIII metal.

Aromatics Formation

Me-UTD-1 can be used to convert light straight run naphthas and similar mixtures to highly aromatic mixtures. Thus, normal and slightly branched chain hydrocarbons, preferably having a boiling range above about 40° C. and less than about 200° C., can be converted to products having a substantial higher octane aromatics content by contacting the hydrocarbon feed with a catalyst comprising Me-UTD-1. It is also possible to convert heavier feeds into BTX or naphthalene derivatives of value using the catalysts of this invention.

The conversion catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium or tin or a mixture thereof may also be used in conjunction with the Group VIII metal compound and preferably a noble metal compound. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

It is critical to the selective production of aromatics in useful quantities that the conversion catalyst be substantially free of acidity, for example, by neutralizing the zeolite with a basic metal, e.g., alkali metal, compound. Methods for rendering the catalyst free of acidity are known in the art. See the aforementioned U.S. Pat. No. 4,910,006 and U.S. Pat. No. 5,316,753 for a description of such methods.

The preferred alkali metals are sodium, potassium, and cesium. The zeolite itself can be substantially free of acidity only at very high silica:alumina mole ratios.

Catalytic Cracking

Hydrocarbon cracking stocks can be catalytically cracked in the absence of hydrogen using Me-UTD-1 in the hydrogen form.

When Me-UTD-1 is used as a catalytic cracking catalyst in the absence of hydrogen, the catalyst may be employed in conjunction with traditional cracking catalysts, e.g., any aluminosilicate heretofore employed as a component in cracking catalysts. Typically, these are large pore, crystalline aluminosilicates. Examples of these traditional cracking catalysts are disclosed in the aforementioned U.S. Pat. No. 4,910,006 and U.S. Pat. No. 5,316,753. When a traditional cracking catalyst (TC) component is employed, the relative weight ratio of the TC to the Me-UTD-1 is generally between about 1:10 and about 500:1, desirably between about 1:10 and about 200:1, preferably between about 1:2 and about 50:1, and most preferably is between about 1:1 and about 20:1. The zeolite of this invention and/or the traditional cracking catalyst may be further ion-exchanged with rare earth ions to modify selectivity.

The cracking catalysts are typically employed with an inorganic oxide matrix component. See the aforementioned U.S. Pat. No. 4,910,006 and U.S. Pat. No. 5,316,753 for examples of such matrix components.

Oligomerization

It is expected that Me-UTD-1 in the hydrogen form can also be used to oligomerize straight and branched chain olefins having from about 2 to 21 and preferably 2–5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous or liquid phase with a catalyst comprising Me-UTD-1.

The zeolite can have the original cations associated therewith replaced by a wide variety of other cations according to techniques well known in the art. Typical cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20% by weight. This is accomplished by using a zeolite with controlled acid activity [alpha value] of from about 0.1 to about 120, preferably from about 0.1 to about 100, as measured by its ability to crack n-hexane.

Alpha values are defined by a standard test known in the art, e.g., as shown in U.S. Pat. No. 3,960,978 issued on Jun.

1, 1976 to Givens, et al. which is incorporated totally herein by reference. If required, such zeolites may be obtained by steaming, by use in a conversion process or by any other method which may occur to one skilled in this art.

Conversion of Paraffins to Aromatics

Me-UTD-1 in the hydrogen form can be used to convert light gas $C_2$–$C_6$ paraffins to higher molecular weight hydrocarbons including aromatic compounds. Preferably, the zeolite will contain a catalyst metal or metal oxide wherein said metal is selected from the group consisting of Group IB, IIB, VIII and IIIA of the Periodic Table. Preferably the metal is gallium, niobium, indium or zinc in the range of from about 0.05 to 5% by weight.

Condensation of Alcohols

Me-UTD-1 can be used to condense lower aliphatic alcohols having 1 to 10 carbon atoms to a gasoline boiling point hydrocarbon product comprising mixed aliphatic and aromatic hydrocarbon. The process disclosed in U.S. Pat. No. 3,894,107 issued Jul. 8, 1975 to Butter et al., describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals, the cation content should in no case be so large as to effectively inactivate the catalyst, nor should the exchange be such as to eliminate all acidity. There may be other processes involving treatment of oxygenated substrates where a basic catalyst is desired.

Isomerization

The present catalyst is highly active and highly selective for isomerizing $C_4$ to $C_7$ hydrocarbons. The activity means that the catalyst can operate at relatively low temperature which thermodynamically favors highly branched paraffins. Consequently, the catalyst can produce a high octane product. The high selectivity means that a relatively high liquid yield can be achieved when the catalyst is run at a high octane.

The present process comprises contacting the isomerization catalyst, i.e., a catalyst comprising Me-UTD-1 in the hydrogen form, with a hydrocarbon feed under isomerization conditions. The feed is preferably a light straight run fraction, boiling within the range of 30° F. to 250° F. and preferably from 60° F. to 200° F. Preferably, the hydrocarbon feed for the process comprises a substantial amount of $C_4$ to $C_7$ normal and slightly branched low octane hydrocarbons, more preferably $C_5$ and $C_6$ hydrocarbons.

It is preferable to carry out the isomerization reaction in the presence of hydrogen. Preferably, hydrogen is added to give a hydrogen to hydrocarbon ratio ($H_2$/HC) of between 0.5 and 10 $H_2$/HC, more preferably between 1 and 8 $H_2$/HC. See the aforementioned U.S. Pat. No. 4,910,006 and U.S. Pat. No. 5,316,753 for a further discussion of isomerization process conditions.

A low sulfur feed is especially preferred in the present process. The feed preferably contains less than 10 ppm, more preferably less than 1 ppm, and most preferably less than 0.1 ppm sulfur. In the case of a feed which is not already low in sulfur, acceptable levels can be reached by hydrogenating the feed in a presaturation zone with a hydrogenating catalyst which is resistant to sulfur poisoning. See the aforementioned U.S. Pat. No. 4,910,006 and U.S. Pat. No. 5,316,753 for a further discussion of this hydrodesulfurization process.

It is preferable to limit the nitrogen level and the water content of the feed. Catalysts and processes which are suitable for these purposes are known to those skilled in the art.

After a period of operation, the catalyst can become deactivated by sulfur or coke. See the aforementioned U.S. Pat. No. 4,910,006 and U.S. Pat. No. 5,316,753 for a further discussion of methods of removing this sulfur and coke, and of regenerating the catalyst.

The conversion catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium and tin may also be used in conjunction with the noble metal. The most preferred metal is platinum. The amount of Group VIII metal present in the conversion catalyst should be within the normal range of use in isomerizing catalysts, from about 0.05 to 2.0 weight percent, preferably 0.2 to 0.8 weight percent.

Alkylation and Transalkylation

Me-UTD-1 can be used in a process for the alkylation or transalkylation of an aromatic hydrocarbon. The process comprises contacting the aromatic hydrocarbon with a $C_2$ to $C_{16}$ olefin alkylating agent or a polyalkyl aromatic hydrocarbon transalkylating agent, under at least partial liquid phase conditions, and in the presence of a catalyst comprising Me-UTD-1.

Me-UTD-1 can also be used for removing benzene from gasoline by alkylating the benzene as described above and removing the alkylated product from the gasoline.

For high catalytic activity, the Me-UTD-1 zeolite should be predominantly in its hydrogen ion form. It is preferred that, after calcination, at least about 80% of the cation sites are occupied by hydrogen ions and/or rare earth ions.

Examples of suitable aromatic hydrocarbon feedstocks which may be alkylated or transalkylated by the process of the invention include aromatic compounds such as benzene, toluene and xylene. The preferred aromatic hydrocarbon is benzene. There may be occasions where naphthalene derivatives may be desirable. Mixtures of aromatic hydrocarbons may also be employed.

Suitable olefins for the alkylation of the aromatic hydrocarbon are those containing 2 to 20, preferably 2 to 4, carbon atoms, such as ethylene, propylene, butene-1, trans-butene-2 and cis-butene-2, or mixtures thereof. There may be instances where pentenes are desirable in this same relationship. The preferred olefins are ethylene and propylene. Longer chain alpha olefins may be used as well.

When transalkylation is desired, the transalkylating agent is a polyalkyl aromatic hydrocarbon containing two or more alkyl groups that each may have from 2 to about 4 carbon atoms. For example, suitable polyalkyl aromatic hydrocarbons include di-, tri- and tetra-alkyl aromatic hydrocarbons, such as diethylbenzene, triethylbenzene, diethylmethylbenzene (diethyltoluene), di-isopropylbenzene, di-isopropyltoluene, dibutylbenzene, and the like. Preferred polyalkyl aromatic hydrocarbons are the dialkyl benzenes. A particularly preferred polyalkyl aromatic hydrocarbon is di-isopropylbenzene.

When alkylation is the process conducted, reaction conditions are as follows. The aromatic hydrocarbon feed should be present in stoichiometric excess. It is preferred that molar ratio of aromatics to olefins be greater than four-to-one to prevent rapid catalyst fouling. The reaction temperature may range from 100° F. to 600° F., preferably 250° F. to 450° F. The reaction pressure should be sufficient to maintain at least a partial liquid phase in order to retard catalyst fouling. This is typically 50 psig to 1000 psig depending on the feedstock and reaction temperature. Contact time may range from 10 seconds to 10 hours, but is usually from 5 minutes to an hour. The weight hourly space velocity (WHSV), in terms of grams (pounds) of aromatic hydrocarbon and olefin per gram (pound) of catalyst per hour, is generally within the range of about 0.5 to 50.

When transalkylation is the process conducted, the molar ratio of aromatic hydrocarbon to polyalkyl aromatic hydrocarbon will generally range from about 1:1 to 25:1, and preferably from about 2:1 to 20:1. The reaction temperature may range from about 100° F. to 600° F., but it is preferably about 250° F. to 450° F. The reaction pressure should be sufficient to maintain at least a partial liquid phase, typically in the range of about 50 psig to 1000 psig, preferably 300 psig to 600 psig. The weight hourly space velocity will range from about 0.1 to 10. U.S. Pat. No. 5,082,990 issued on Jan. 21, 1992 to Hsieh, et al. describes such processes and is incorporated herein by reference.

Xylene Isomerization

Me-UTD-1 in the hydrogen form may also be useful in a process for isomerizing one or more xylene isomers in a $C_8$ aromatic feed to obtain ortho-, meta-, and para-xylene in a ratio approaching the equilibrium value. In particular, xylene isomerization is used in conjunction with a separate process to manufacture paraxylene. For example, a portion of the para-xylene in a mixed $C_8$ aromatics stream may be recovered by crystallization and centrifugation. The mother liquor from the crystallizer is then reacted under xylene isomerization conditions to restore ortho-, meta- and para-xylenes to a near equilibrium ratio. At the same time, part of the ethylbenzene in the mother liquor is converted to xylenes or to products which are easily separated by filtration. The isomerate is blended with fresh feed and the combined stream is distilled to remove heavy and light by-products. The resultant $C_8$ aromatics stream is then sent to the crystallizer to repeat the cycle.

Optionally, isomerization in the vapor phase is conducted in the presence of 3.0 to 30.0 moles of hydrogen per mole of alkylbenzene (e.g., ethylbenzene). If hydrogen is used, the catalyst should comprise about 0.1 to 2.0 wt % of a hydrogenation/dehydrogenation component selected from Group VIII (of the Periodic Table) metal component, especially platinum or nickel. By Group VIII metal component is meant the metals and their compounds such as oxides and sulfides.

Optionally, the isomerization feed may contain 10 to 90 wt % of a diluent such as toluene, trimethylbenzene, naphthenes or paraffins.

Other Uses for Me-UTD-1

Me-UTD-1 can also be used as an adsorbent with high selectivities based on molecular sieve behavior and also based upon preferential hydrocarbon packing within the pores.

Me-UTD-1 may also be used for the catalytic reduction of the oxides of nitrogen in a gas stream. Typically the gas stream also contains oxygen, often a stoichiometric excess thereof. Also, the Me-UTD-1 may contain a metal or metal ions within or on it which are capable of catalyzing the reduction of the nitrogen oxides. Examples of such metals or metal ions include copper, cobalt and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples demonstrate but do not limit the present invention.

Example 1

Preparation of Template

Five grams of decamethyl cobaltecium hexafluorophosphate (purchased) were dissolved in a warmed solution of 1200 cc ethanol and 800 cc water. This solution was then run through a column of Dowex 50-X8 cation exchange resin (previously washed with 60% ethanol ) with the complex sticking to the resin. Next a 50/50 solution of 2N HCl and ethanol (total=4,500 cc) was run over the exchange resin in a column in order to elute the cobalt complex as a chloride salt. The ethanol portion was stripped off under reduced pressure and at 70° C. The remaining acidic solution was neutralized with concentrated NaOH. This solution was concentrated down, under reduced pressure and heating to 800 cc. A threefold extraction was carried out with chloroform using 400 cc each time. Twenty grams of anhydrous $MgSO_4$ was used to dry the combined extracts and the solution was stripped to dryness to yield the chloride salt.

The recovered chloride salt was then dissolved in 10 cc water and mixed with 20 cc of BioRad AG-1X8 hydroxide exchange resin. The resulting mixture was stirred overnight, after which the resin was filtered off. The resin was then washed with a little additional water and a yellow-brown solution was collected which titrated to 0.25 Molar in hydroxide. Additional product was monitored as coming off resin as long as the yellow color was observed in the elution collection. The color can be used as a measure of extent of ion-exchange in either of the two exchange steps described.

Example 2

Synthesis of Borosilicate B-UTD-1

The synthesis of a small crystal borosilicate B-UTD-1 was carried out by combining the following amounts of reagents in a Teflon liner for a Parr 125 cc reactor, and heating for 5 days without stirring at 150° C. Twenty grams of a 0.21 M solution of the cobaltecium hydroxide template of Example 1 was mixed with 3.7 cc of 1.0N NaOH. Lastly, 2.20 grams of calcined boron beta zeolite was added to supply both the boron and silicon to the reaction. The product crystallized as clusters of very small rods, and the XRD pattern was considerably line-broadened compared to the pure silica version of UTD-1. The crystallite size was estimated by TEM methods to be about 500–1000 Å along the C axis. The product (which still contained the template) was analyzed by X-ray diffraction and the results are tabulated in Table II below.

TABLE II

As-Synthesized B-UTD-1

| 2 Theta | d | Relative Intensity |
|---|---|---|
| 5.94 | 14.9 | 26 |
| 7.46 | 11.8 | 33 |
| 12.0 | 7.4 | 25 |
| 14.6 | 6.08 | 28 |
| 18.1 | 4.90 | 21 |
| 19.4 | 4.57 | 30 |
| 21.2 | 4.19 | 100 |
| 22.1 | 4.02 | 43 |
| 22.5 | 3.95 | 28 |
| 24.4 | 3.65 | 19 |

A very novel and unexpected aspect of this synthesis is that the recovered reaction filtrate can then be directly reused by simply adding an additional charge of calcined boron beta zeolite. No additional base need be added and the presence of dissolved sodium borates does not seem to pose a problem for the crystallization. Of course, the filtrate must contain sufficient template for the B-UTD-1 to form, but this reuse of the filtrate allows one to maximize the use of the template. In fact, this methodology can be employed yet a third time as well. With each reaction the filtrate pH is lower, and as such it might be expected that reaction crystallization times will start to lengthen. Once the effective pH of the filtrate drops below about 9, it may not be possible to reuse it. However, using this method, a very high efficiency for using the cobaltecium template can be obtained. This is an important discovery in that the cobaltecium complex is the most expensive component in the system.

Thus, the solution remaining from the reaction described above (which still contained some of the template) was transferred to a new reactor and the same amount of B-Beta as described above was added to it. The reaction was run as described above, with the resulting product being B-UTD-1.

Example 3

Calcination of B-UTD-1

The as-made B-UTD-1 can be calcined to remove the organic material in the pores. The material was calcined at 60° C. increase per hour up to 120° C. where it was held for 2 hours. The atmosphere was nitrogen with a small amount of air being bled into the flow. Heating was continued at 60° C. per hour up to 540° C. and the heating was held at this temperature for 4 hours. The calcination was then taken to 600° C. over 2 hours and held at this temperature for another 4 hours before the sample was cooled. The mass loss was typically 12–15% and a gray-green solid was obtained. The calcined B-UTD-1 was analyzed by X-ray diffraction and the results are tabulated in Table III below.

TABLE III

Calcined B-UTD-1

| 2 Theta | d | Relative Intensity |
|---|---|---|
| 6.09 | 14.5 | 94 |
| 7.71 | 11.5 | 49 |
| 14.7 | 6.04 | 9 |
| 18.3 | 4.86 | 12 |
| 19.9 | 4.46 | 16 |
| 20.3 | 4.37 | 8 |
| 21.3 | 4.17 | 100 |
| 22.1 | 4.01 | 15 |
| 22.6 | 3.92 | 10 |
| 24.4 | 3.64 | 9 |
| 25.0 | 3.56 | 10 |
| 26.3 | 3.39 | 9 |
| 28.4 | 3.15 | 9 |
| 29.4 | 3.04 | 7 |
| 32.6 | 2.75 | 8 |

Example 4

Conversion of B-UTD-1 to Active Acidic Form

The task of both removing cobalt and converting the high-silica borosilicate UTD-1 to its more strongly acidic aluminosilicate form was accomplished in two sequential steps. First, the calcined product of Example 3 was refluxed in 2N HCl for 1–2 days, yielding a pink solution as cobalt was dissolved. The solid was recovered, briefly washed, and then reheated to 140° C. in the presence of aluminum nitrate solution. The proportions to form the solution were 1:1.1:10 for zeolite: aluminum nitrate: water. The heating was carried out in a Teflon lined reactor for 3 days. At this stage the aluminosilicate had lost no crystallinity. This was also true of a sample analyzed just after reflux in 2N HCl solution. The aluminosilicate UTD-1 (A1-UTD-1) was now ready for use in catalytic reactions. The A1-UTD-1 (calcined) was analyzed and found to have a silica to alumina mole ratio of 88. It was also analyzed by X-ray diffraction and the results are tabulated in Table IV below.

TABLE IV

A1-UTD-1

| 2 Theta | d | Relative Intensity |
|---|---|---|
| 5.97 | 14.8 | 100 |
| 7.60 | 11.6 | 53 |
| 9.22 | 9.58 | 6 |
| 12.4 | 7.11 | 5 |
| 14.4 | 6.13 | 7 |
| 17.9 | 4.93 | 7 |
| 19.7 | 4.49 | 16 |
| 21.1 | 4.21 | 79 |
| 21.9 | 4.06 | 10 |
| 22.4 | 3.96 | 11 |
| 23.2 | 3.83 | 6 |
| 24.2 | 3.67 | 4 |
| 25.1 | 3.55 | 3 |
| 26.0 | 3.43 | 5 |
| 27.9 | 3.19 | 3 |
| 29.3 | 3.05 | 4 |
| 29.8 | 3.00 | 5 |
| 32.2 | 2.78 | 4 |
| 35.3 | 2.54 | 3 |
| 36.7 | 2.45 | 4 |
| 37.5 | 2.40 | 4 |

Example 5

Conversion of Methanol Using A1-UTD-1

A1-UTD-1 material was tested as a catalyst for the conversion of methanol to higher hydrocarbons. A Al-UTD-1 sample with only a small amount of Al in the framework was run at 400° C. with methanol as feed, delivered by syringe pump, at atmospheric pressure (nitrogen carrier gas) and using a space-velocity of 1.2. Products from collecting the liquid phase in a cold trap, and subsequent analysis by GC/MS revealed a range of polymethylated benzenes. Considerable quantities of pentamethyl and hexamethyl benzene were detected, indicating large-pore zeolite behavior.

Example 6

Constraint Index Determination

The aluminosilicate Al-UTD-1, typical of product from Example 4, in the hydrogen form and calcined in air for about four hours at about 540° C. was pelleted, broken and meshed (20–40). About 0.50 gram was loaded into a ⅜ inch stainless steel tube with alundum on both sides of the zeolite bed. After in-situ drying to about 538° C., the catalyst is cooled down to about 370° C. in a flow of helium. A 50/50 feed of n-hexane and 3-methylpentane was introduced to run a Constraint Index test for the Al-UTD-1.

The feed conversion was 50% for the first sampling, occurring at 10 minutes of reaction. The catalysts showed gradual fouling with the conversion dropping to 30% after several hours. However, the C.I. value remained constant over this period, measuring at 0.2. This is also consistent with a large pore zeolite, showing no steric preference for cracking the smaller, linear hexane isomer. The $C_5$ iso/normal ratio was near 20 and in the same area as other known large pore zeolites like Zeolite Y or SSZ-24.

Example 7

Hydrocracking

The Al-UTD-1 was ion-exchanged in solution to give a palladium-containing zeolite. The exchange solution was buffered with ammonium hydroxide to pH 9.5–10.5. The palladium salt was the tetraamine dinitrate. The intent was to achieve 0.5 wt. % loading of palladium. The exchange was carried out at room temperature for 3–4 days and, after collection by filtration, followed by washing and drying. The resulting solids were calcined up to 482° C. for a period of 3 hours in air. The pelleted, broken and meshed material was packed into a reactor and prepared for reaction with hexadecane under high hydrogen pressures (1200 psi).

At 590° F., and without titration, the conversion was already exceeding 96%. The proportion of cracking to isomerization behavior was about 2/1. The $C_{5+}$ fraction over the $C_{4-}$ was typically greater than 10 times as much.

Example 8

Preparation of Pt/Cs/Al-UTD-1

A sample of cesium-neutralized Al-UTD-1 was prepared by suspending 0.67 g of Al-UTD-1 (prepared as described in Example 4) in 10 g of water. 0.33 Gram of CsOH solution (containing 66,450 ppm Cs) was added to 5 g water. The resulting CsOH solution was added to the zeolite slurry with hand shaking, and the hand shaking continued for another three minutes. The suspension was then placed on a shaker and shaken at room temperature for 24 hours. The pH value of the suspension was 10.0.

The suspension was filtered without washing with water, and the resulting solid was air dried at room temperature overnight. The resulting solid was calcined in air with the following temperature program:

from room temperature to 250° F. at a heating rate of 1° F./minute,
at 25.0° F. for 16 hours,
from 250° F. to 570° F. at a heating rate of 1.8° F./minute,
at 570° F. for 2 hours,
cool down from 570° F. to room temperature within 5 hours.

The Cs/Al-UTD-1 prepared above was further exchanged to make Pt/Cs/Al-UTD-1. 0.62 Gram of the above Cs/Al-UTD-1 was suspended in 10 g of water. $Pt(NH_3)_4Cl_2H_2O$ (5.6 mg) was added to 6 g water. The resulting Pt solution was added to the zeolite slurry with hand shaking, and hand shaking continued for three minutes. Then the suspension was placed on a shaker and shaken at room temperature for 24 hours. The pH of the suspension was measured and found to be 9.6. The suspension was filtered without washing with water, and the resulting solid was air dried at room temperature overnight. The resulting solid was calcined in air with the following temperature program:

from room temperature to 250° F. at a heating rate of 1° F./minute,
at 250° F. for 16 hours,
from 250° F. to 570° F. at a heating rate of 1.8° F./minute,
at 570° F. for 2 hours,
cool down from 570° F. to room temperature within 5 hours.

The above Pt/Cs/Al-UTD-1 was tested for lack of acidity as follows:

The above Pt/Cs/AL-UTD-1 was pretreated in hydrogen flow (300 ml/min.) using the following temperature program:

from room temperature to 400° F. at a heating rate of 10° F./minute,
at 400° F. for 30 minutes,
from 400° F. to 900° F. at a heating rate of 16.7° F./minute,
at 900° F. for 1 hour,
cool down to 800° F. to start the reaction for the acidity test.

All the reactions described below were conducted in a flow-type reactor system equipped with an on-line capillary GC.

The feed used for this test was anhydrous n-octane containing 20 ppm sulfur (as dimethyl disulfide). The sulfur in the feed was used to poison the Pt species loaded in the zeolite. After the poisoning was completed, the catalytic activity of Pt species was reduced to a very low value. It is known that acid-catalyzed cracking reaction will preferably result in the formation of iso-alkanes such as iso-butane. By contrast, n-alkanes such as n-butane are the main products of metal-catalyzed cracking reactions. Based on this background, the acidity (if any) of the catalysts is expressed by using the ratio of iso-butane to n-butane (i-Bu/n-Bu) produced at a $C_5$ yield of 95% after Pt has lost its activity. The higher the (i-Bu/n-Bu) ratio, the stronger the acidity.

The above Pt/Cs/Al-UTD-1 had an (i-Bu/n-Bu) ratio of 0.03, which is very low and reveals the complete neutralization of acid sites by Cs species in this catalysts.

The reaction temperature was adjusted to 930° F. to obtain a $C_5+$ yield of 95%. Other reaction parameters were: pressure=200 psig and WHSV=3 $h^{-1}$.

Through this reaction, the catalyst was also sulfided for the reforming screening to be described below.

Example 9

Reforming Using Pt/Cs/Al-UTD-1

Immediately after the acidity test described above, the sulfided Pt/Cs/Al-UTD-1 was screened in the same reactor system for reforming. A 300° F. end point naphtha was used as feed and its composition is listed below. The reactions were performed at pressure=130 psig and WHSV=3 per hour. The reaction temperature was varied between 930 and 980° F. Results are listed below:

|  | wt. % in Feed | Yield, wt. % at 930° F. | Yield, wt. % at 980° F. |
| --- | --- | --- | --- |
| methane | 0 | 0.25 | 0.81 |
| ethane | 0 | 0.37 | 1.74 |
| propane | 0.01 | 0.57 | 2.18 |
| butanes | 0.11 | 0.64 | 1.77 |
| pentenes | 1.20 | 1.42 | 2.18 |
| hexanes | 7.61 | 4.75 | 4.85 |
| benzene | 0.37 | 1.36 | 1.44 |
| toluene | 4.03 | 8.32 | 8.77 |
| EB + xylenes | 8.14 | 14.77 | 16.66 |
| C9 aromatics | 0.23 | 1.77 | 2.82 |
| C7–C9 sats | 74.57 | 3.66 | 2.31 |
| unknowns | 3.73 | 5.14 | 7.21 |
| C5+ total | 99.88 | 97.12 | 92.26 |

Example 10

The Spaciousness Index (SI) is defined as the yield ratio of iso-butane and n-butane in hydrocracking of a C10-cycloalkane such as n-butylcyclohexane over bifunctional zeolites or other molecular sieve materials. The ratio increases with increasing pore size and is, therefore, a valuable tool for characterizing the shape selective properties of molecular sieve materials. Based on the results of a variation of nature and amount of the noble metal exchanged into the acid zeolites, the use of Pd as hydrogenation/dehydrogenation component is recommended. The optimum Pd loading is around 0.27 wt. %. In addition, experimental data reveal that the Spaciousness Index (SI) is under certain circumstances independent of (i) the reaction temperature, (ii) the Si/Al ratio of zeolite and (iii) the crystal size. Hence, it represents a characteristic constant for a given zeolite.

There are several publications on the Spaciousness Index (SI). The main two references are:
  (i) J. Weitkamp, S. Ernst and R. Kumar, Appl. Catal. 27 (1986) 207–210.
  (ii) J. Weitkamp, S. Ernst and C. Y. Chen, in "Zeolites: Facts, Figures, Future", pp. 1115–1129, Proceedings of the 8th International Zeolite Conference, Amsterdam, The Netherlands, Jul. 10–14, 1989, Studies in Surface Science and Catalysis, Vol. 49, edited by P. A. Jacobs and R. A. van Santen, Publisher: Elsevier, Amsterdam—Oxford—New York—Tokyo, 1989.

For the determination of the Spaciousness Index, Pd/Al-UTD-1 (0.27 wt. % Pd) was pretreated in hydrogen flow (300 ml/min.) using the following temperature program:
  from room temperature to 660° F. at a heating rate of 2° F./minute,
  at 660° F. for 10 hours,
  cool down to certain reaction temperature (e.g., 480° F.) to start the determination of the Spaciousness Index.

The reactions were performed at pressure=130 psig and WHSV=3 h$^{-1}$. The reaction temperature was varied between 430 and 660° F. n-Butylcyclohexane was used as feed.

Based on the results, it was determined that the Pd/Al-UTD-1 has a Spaciousness Index of 11.5, where the yield of hydrocracking products ranges between 15 and 65%. In the literature, the following values of the SI are reported for various zeolites: 21.0 (Y), 20.5 (ZSM-20), 19.0 (Beta), 17.0 (L), 12.5 (ZSM-25), 7.5 (mordenite), 5.0 (EU-1 and offretite), 4.0 (SAPO-5), 3.0 (ZSM-12) and 1.0 (ZSM-5/-11/-22/-23). According to the above SI values, the effective pore size of the Pd/Al-UTD-1 is smaller than the effective diameter of the largest voids in Y, ZSM-20, beta and L but larger than those of other one-dimensional 12-membered ring zeolites.

Example 11

Pt-Containing All-Silica UTD-1 Constraint Index

A sample of all-silica UTD-1 was prepared in a manner similar to that described in U.S. Pat. No. 5,489,424. It was calcined and analyzed by X-ray diffraction and the results are tabulated in Table V below

TABLE V

| Calcined All-silica UTD-1 | | |
| --- | --- | --- |
| 2 Theta | d | Relative Intensity |
| 5.938 | 14.87 | 100 |
| 7.559 | 11.69 | 56.8 |
| 9.233 | 9.57 | 5.6 |
| 10.318 | 8.57 | 1.3 |
| 14.432 | 6.13 | 6.5 |
| 18.069 | 4.91 | 6.2 |
| 19.703 | 4.50 | 10.0 |
| 20.149 | 4.40 | 3.0 |
| 21.002 | 4.23 | 26.4 |
| 21.861 | 4.06 | 5.4 |
| 22.398 | 3.97 | 3.1 |
| 23.035 | 3.86 | 2.5 |
| 24.220 | 3.67 | 7.1 |
| 24.886 | 3.58 | 5.7 |
| 26.093 | 3.41 | 3.2 |
| 28.131 | 3.17 | 2.1 |
| 29.784 | 3.00 | 2.1 |
| 32.257 | 2.77 | 2.3 |

The sample was platinum exchanged in a manner similar to that described in Example 7 (nominal loading of Pt 0.5 wt %) and calcined. The Constraint Index of the resulting material was determined using the procedure of Example 6 at 800° F. After ten minutes, the conversion was about 10%. A spectrum of aromatics was made with the following ratios:

| Benzene | 2.45 |
| --- | --- |
| Toluene | 1.00 |
| Xylenes | 1.75 |
| C$_9$ and higher | 2.80 |

What is claimed is:

1. An aluminosilicate zeolite having a silica/alumina mole ratio of about 500 or less, and having, after calcination, the X-ray diffraction lines of Table I.

2. The zeolite of claim 1, wherein said mole ratio of the first oxide to the second is from about 500 to about 50.

3. The zeolite of claim 1, wherein said silica/alumina mole ratio is from about 200 to about 50.

4. A zeolite comprising a first oxide selected from the group consisting of silicon oxide, germanium oxide and mixtures thereof and a second oxide selected from the group consisting of aluminum oxide, gallium oxide, iron oxide, indium oxide and mixtures of aluminum oxide, boron oxide, gallium oxide, iron oxide, and indium oxide, said zeolite having, after calcination, the X-ray diffraction lines of Table I, and having a mole ratio of the first oxide to the second oxide of about 500 or less.

5. A zeolite according to claim 4 wherein the oxides comprise silicon oxide and aluminum oxide.

6. A zeolite according to claim 4 wherein said zeolite is predominantly in the hydrogen form.

7. A zeolite according to claim 4 made substantially free of acidity by neutralizing said zeolite with a basic metal.

8. The zeolite of claim 4, wherein said mole ratio of the first oxide to the second is from about 500 to about 50.

9. The zeolite of claim 4, wherein said silica/alumina mole ratio is from about 200 to about 50.

10. A zeolite comprising a first oxide selected from the group consisting of silicon oxide, germanium oxide and mixtures thereof and a second oxide selected from the group consisting of aluminum oxide, gallium oxide, iron oxide, indium oxide and mixtures of aluminum oxide, boron oxide, gallium oxide, iron oxide, and indium oxide, said zeolite having, after calcination, the X-ray diffraction lines of Table I, and having a mole ratio of the first oxide to the second oxide of about 500 or less, and having a crystallite size, as estimated by TEM along the C axis, of about 2000 Å or less.

11. A zeolite according to claim 10 wherein the crystallite size is about 500 to 1000 Å.

12. A method of preparing a boron-containing zeolite comprising oxides of boron and silica, said zeolite having, after calcination, the X-ray diffraction lines of Table I, said method comprising:

(a) preparing an aqueous solution containing calcined boron-containing Beta zeolite, an alkali metal or alkaline earth metal cation, and a bis(pentamethylcyclopentadienyl) cobalt (III) ion having an anionic counterion which is not detrimental to the formation of the boron-containing zeolite;

(b) maintaining the aqueous solution under conditions sufficient to form crystals of the boron-containing zeolite; and (c) recovering crystals of the boron-containing zeolite.

* * * * *